United States Patent
Pereira et al.

(10) Patent No.: US 12,192,243 B2
(45) Date of Patent: Jan. 7, 2025

(54) SECURITY POLICY SELECTION BASED ON CALCULATED UNCERTAINTY AND PREDICTED RESOURCE CONSUMPTION

(71) Applicant: Kyndryl, Inc., New York, NY (US)

(72) Inventors: Robson Pereira, Hortolândia (BR);
Leandro Cesar Fida, Campinas (BR);
Edson Jose Montanhini, Hortolândia (BR); Sergio Varga, Campinas (BR);
Daniele Jaqueline Marchiori, São Paulo (BR)

(73) Assignee: Kyndryl, Inc., New York, NY (US)

(*) Notice: Subject to any disclaimer, the term of this patent is extended or adjusted under 35 U.S.C. 154(b) by 236 days.

(21) Appl. No.: 17/990,511

(22) Filed: Nov. 18, 2022

(65) Prior Publication Data

US 2024/0171613 A1    May 23, 2024

(51) Int. Cl.
| | | |
|---|---|---|
| *G06F 17/00* | (2019.01) | |
| *G06N 20/00* | (2019.01) | |
| *H04L 9/40* | (2022.01) | |
| *H04L 29/06* | (2006.01) | |

(52) U.S. Cl.
CPC .............. *H04L 63/20* (2013.01); *G06N 20/00* (2019.01); *H04L 63/105* (2013.01)

(58) Field of Classification Search
CPC ........ H04L 63/20; H04L 63/105; G06N 20/00
USPC ............................................................ 726/1
See application file for complete search history.

(56) References Cited

U.S. PATENT DOCUMENTS

| | | |
|---|---|---|
| 7,260,830 B2 | 8/2007 | Sugimoto |
| 7,712,137 B2 | 5/2010 | Meier |
| 7,966,659 B1 | 6/2011 | Wilkinson et al. |
| 8,201,257 B1 | 6/2012 | Andres et al. |
| 9,003,476 B2 | 4/2015 | Baumhof |
| 9,294,497 B1 | 3/2016 | Ben-Or et al. |

(Continued)

FOREIGN PATENT DOCUMENTS

| | | |
|---|---|---|
| JP | 2018521430 A | 8/2018 |
| MX | 2011000019 A | 7/2011 |

OTHER PUBLICATIONS

International Search Report and Written Opinion from PCT Application No. PCT/EP2023/054547, dated Aug. 4, 2023, 7 pages.

(Continued)

*Primary Examiner* — Brandon Hoffman
*Assistant Examiner* — Samuel Ambaye
(74) *Attorney, Agent, or Firm* — CANTOR COLBURN LLP; Dan Housley

(57) ABSTRACT

A computer-implemented method according to one embodiment includes receiving a request to perform a security policy implementation analysis for a first deployment associated with a first client in an IT environment. IT information associated with the first deployment is collected. The method further includes applying trained machine learning models to analyze the IT information of the first client to compute a security policy for the first deployment. The security policy is computed based on a calculated uncertainty of effects that applying the security policy to the first deployment is capable of causing, and a predicted amount of resources of the first deployment that applying the security policy to the first deployment would consume. An indication of the security policy is output for display in a dashboard on a display of a user device of the first client.

17 Claims, 10 Drawing Sheets

(56) References Cited

U.S. PATENT DOCUMENTS

| | | |
|---|---|---|
| 9,332,028 B2 | 5/2016 | Xaypanya et al. |
| 9,571,506 B2 | 2/2017 | Boss et al. |
| 9,876,775 B2 | 1/2018 | Mossbarger |
| 10,462,171 B2 | 10/2019 | Weingarten et al. |
| 2007/0157311 A1 | 7/2007 | Meier et al. |
| 2013/0133026 A1 | 5/2013 | Burgess |
| 2016/0352778 A1* | 12/2016 | Chari .................... G06N 20/00 |
| 2017/0237778 A1 | 8/2017 | DiGiambattista et al. |
| 2018/0234463 A1 | 8/2018 | Briski et al. |
| 2019/0260779 A1 | 8/2019 | Bazalgette et al. |
| 2019/0318100 A1 | 10/2019 | Bhatia et al. |
| 2019/0327271 A1 | 10/2019 | Saxena et al. |
| 2020/0028872 A1 | 1/2020 | Ng et al. |
| 2020/0036739 A1 | 1/2020 | Novikov et al. |
| 2021/0058296 A1* | 2/2021 | Buck ...................... H04L 63/20 |

OTHER PUBLICATIONS

IBM, "Viewing your current posture," IBM, Security and Compliance Center, Oct. 4, 2022, 7 pages, retrieved from https://cloud.ibm.com/docs/security-compliance?topic=security-compliance-view-posture.

Microsoft, "Protect against security threats by using Azure Security Center," Microsoft Learn, 2022, 4 pages, retrieved from https://learn.microsoft.com/en-us/training/modules/protect-against-security-threats-azure/2-protect-threats-security-center.

\* cited by examiner

SECURITY POLICY SELECTION BASED ON CALCULATED UNCERTAINTY AND PREDICTED RESOURCE CONSUMPTION

BACKGROUND

The present invention relates to security policies applied in information and technology (IT) environments, and more specifically, this invention relates to computing a recommended security policy based on a calculated uncertainty and a predicted amount of resource consumption each associated with applying the security policy.

An IT environment may include a set of applications deployed on top of IT components, e.g., server systems, compute networks, networking devices, computer devices in communication with at least one other computer device, etc. Furthermore, these applications may include any known type of business application which may be managed by an administrator of a business. Within such an IT environment, the IT components may be broken down into sub-groups of IT components that are each associated with and managed by different actors, e.g., clients, administrators, businesses, etc.

IT environments are constantly changing, e.g., due to human interactions, due to system-to-system interactions, due to security threats to one or more deployments in an IT environment being developed, etc. To ensure that an IT environment remains secure, a set of IT security policies is typically applied on the IT environment to minimize security risks that a wrong or weak configuration can bring or enable within the IT environment that may as a result be exploited by attackers.

These security policies intend to provide a customized level of security that is valuable to an IT infrastructure aligned with a business that a company runs. It is not simple to identify all the security issues that an IT infrastructure can bring to business applications, e.g., malware, customer data being accessible to unauthorized parties, phishing attacks, governing laws, etc. Furthermore, depending on the security issue and how the issue can potentially be exploited, the risk these issues pose to such applications and/or infrastructure may be relatively lower or relatively higher. Due to this, companies aim to implement IT security policies that ensure security risks are kept low, and that do not impact business operations of the company.

SUMMARY

A computer-implemented method, according to one embodiment, includes receiving a request to perform a security policy implementation analysis for a first deployment associated with a first client in an IT environment. IT information associated with the first deployment is collected. The method further includes applying trained machine learning models to analyze the IT information of the first client to compute a security policy for the first deployment. The security policy is computed based on a calculated uncertainty of effects that applying the security policy to the first deployment is capable of causing, and a predicted amount of resources of the first deployment that applying the security policy to the first deployment would consume. An indication of the security policy is output for display in a dashboard of a user device of the first client.

A computer program product, according to another embodiment, includes a computer readable storage medium having program instructions embodied therewith. The program instructions are executable by a computer to cause the computer to perform the foregoing method.

A system, according to another embodiment, includes a hardware processor, and logic integrated with the processor, executable by the processor, or integrated with and executable by the processor. The logic is configured to perform the foregoing method.

Other aspects and embodiments of the present invention will become apparent from the following detailed description, which, when taken in conjunction with the drawings, illustrate by way of example the principles of the invention.

DETAILED DESCRIPTION

The following description is made for the purpose of illustrating the general principles of the present invention and is not meant to limit the inventive concepts claimed herein. Further, particular features described herein can be used in combination with other described features in each of the various possible combinations and permutations.

Unless otherwise specifically defined herein, all terms are to be given their broadest possible interpretation including meanings implied from the specification as well as meanings understood by those skilled in the art and/or as defined in dictionaries, treatises, etc.

It must also be noted that, as used in the specification and the appended claims, the singular forms "a," "an" and "the" include plural referents unless otherwise specified. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The following description discloses several preferred embodiments of systems, methods and computer program products for computing a recommended security policy based on a calculated uncertainty and a predicted amount of resource consumption each associated with applying the security policy.

In one general embodiment, a computer-implemented method includes receiving a request to perform a security policy implementation analysis for a first deployment associated with a first client in an IT environment. IT information associated with the first deployment is collected. The method further includes applying trained machine learning models to analyze the IT information of the first client to compute a security policy for the first deployment. The security policy is computed based on a calculated uncertainty of effects that applying the security policy to the first deployment is capable of causing, and a predicted amount of resources of the first deployment that applying the security policy to the first deployment would consume. An indication of the security policy is output for display in a dashboard on a display of a user device of the first client.

In another general embodiment, a computer program product includes a computer readable storage medium having program instructions embodied therewith. The program instructions are executable by a computer to cause the computer to perform the foregoing method.

In another general embodiment, a system includes a hardware processor, and logic integrated with the processor, executable by the processor, or integrated with and executable by the processor. The logic is configured to perform the foregoing method.

Figure 1:
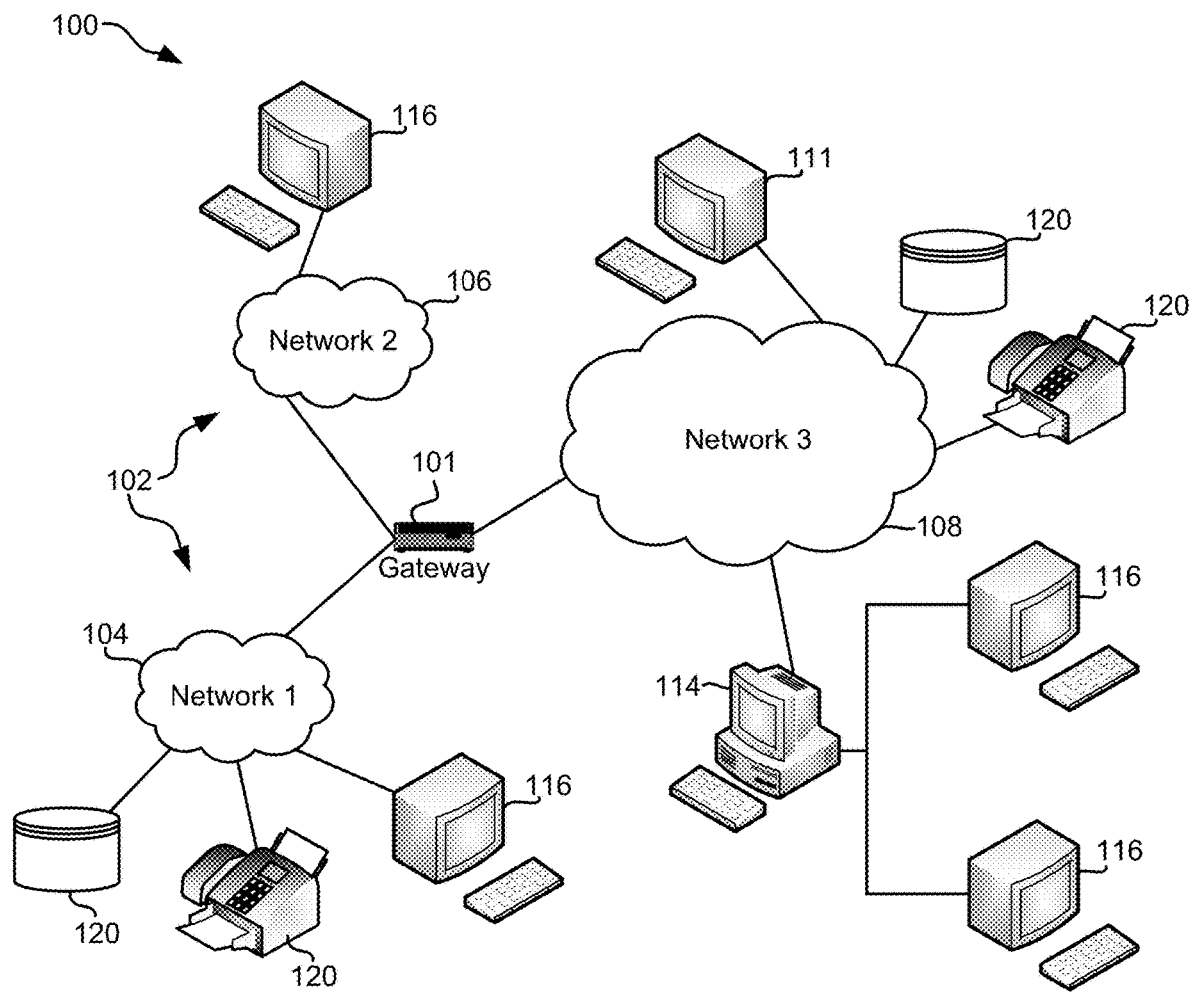
FIG. 1 is a diagram of a network architecture, in accordance with one embodiment of the present invention.

FIG. 1 illustrates an architecture 100, in accordance with one embodiment. As shown in FIG. 1, a plurality of remote networks 102 are provided including a first remote network 104 and a second remote network 106. A gateway 101 may be coupled between the remote networks 102 and a proximate network 108. In the context of the present architecture 100, the networks 104, 106 may each take any form including, but not limited to a local area network (LAN), a wide area network (WAN) such as the Internet, public switched telephone network (PSTN), internal telephone network, etc.

In use, the gateway 101 serves as an entrance point from the remote networks 102 to the proximate network 108. As such, the gateway 101 may function as a router, which is capable of directing a given packet of data that arrives at the gateway 101, and a switch, which furnishes the actual path in and out of the gateway 101 for a given packet.

Further included is at least one data server 114 coupled to the proximate network 108, and which is accessible from the remote networks 102 via the gateway 101. It should be noted that the data server(s) 114 may include any type of computing device/groupware. Coupled to each data server 114 is a plurality of user devices 116. User devices 116 may also be connected directly through one of the networks 104, 106, 108. Such user devices 116 may include a desktop computer, lap-top computer, hand-held computer, printer or any other type of logic. It should be noted that a user device 111 may also be directly coupled to any of the networks, in one embodiment.

A peripheral 120 or series of peripherals 120, e.g., facsimile machines, printers, networked and/or local storage units or systems, etc., may be coupled to one or more of the networks 104, 106, 108. It should be noted that databases and/or additional components may be utilized with, or integrated into, any type of network element coupled to the networks 104, 106, 108. In the context of the present description, a network element may refer to any component of a network.

According to some approaches, methods and systems described herein may be implemented with and/or on virtual systems and/or systems which emulate one or more other systems, such as a UNIX® system which emulates an IBM® z/OS® environment (IBM and all IBM-based trademarks and logos are trademarks or registered trademarks of International Business Machines Corporation and/or its affiliates), a UNIX® system which virtually hosts a known operating system environment, an operating system which emulates an IBM® z/OS® environment, etc. This virtualization and/or emulation may be enhanced through the use of VMware® software, in some embodiments.

In more approaches, one or more networks 104, 106, 108, may represent a cluster of systems commonly referred to as a "cloud." In cloud computing, shared resources, such as processing power, peripherals, software, data, servers, etc., are provided to any system in the cloud in an on-demand relationship, thereby allowing access and distribution of services across many computing systems. Cloud computing typically involves an Internet connection between the systems operating in the cloud, but other techniques of connecting the systems may also be used.

Figure 2:
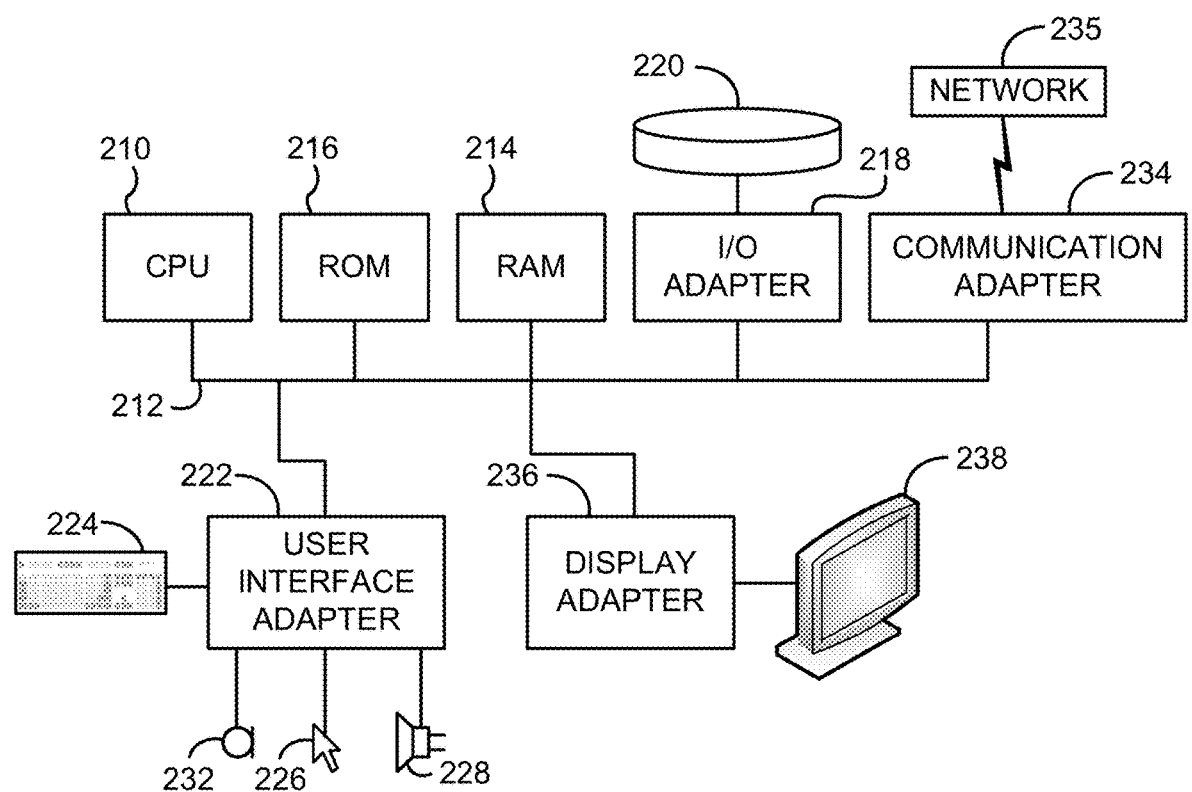
FIG. 2 is a diagram of a representative hardware environment that may be associated with the servers and/or clients of FIG. 1, in accordance with one embodiment of the present invention.

FIG. 2 shows a representative hardware environment associated with a user device 116 and/or server 114 of FIG. 1, in accordance with one embodiment. Such figure illustrates a typical hardware configuration of a workstation having a central processing unit 210, such as a microprocessor, and a number of other units interconnected via a system bus 212.

The workstation shown in FIG. 2 includes a Random Access Memory (RAM) 214, Read Only Memory (ROM) 216, an input/output (I/O) adapter 218 for connecting peripheral devices such as disk storage units 220 to the bus 212, a user interface adapter 222 for connecting a keyboard 224, a mouse 226, a speaker 228, a microphone 232, and/or other user interface devices such as a touch screen and a digital camera (not shown) to the bus 212, communication adapter 234 for connecting the workstation to a communication network 235 (e.g., a data processing network) and a display adapter 236 for connecting the bus 212 to a display device 238.

The workstation may have resident thereon an operating system such as the Microsoft Windows® Operating System (OS), a macOS®, a UNIX® OS, etc. It will be appreciated that a preferred embodiment may also be implemented on platforms and operating systems other than those mentioned. A preferred embodiment may be written using eXtensible Markup Language (XML), C, and/or C++ language, or other programming languages, along with an object oriented programming methodology. Object oriented programming (OOP), which has become increasingly used to develop complex applications, may be used.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be accomplished as one step, executed concurrently, substantially concurrently, in a partially or wholly temporally overlapping manner, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

Moreover, a system according to various embodiments may include a processor and logic integrated with and/or executable by the processor, the logic being configured to perform one or more of the process steps recited herein. The processor may be of any configuration as described herein, such as a discrete processor or a processing circuit that includes many components such as processing hardware, memory, I/O interfaces, etc. By integrated with, what is meant is that the processor has logic embedded therewith as hardware logic, such as an application specific integrated circuit (ASIC), a FPGA, etc. By executable by the processor, what is meant is that the logic is hardware logic; software logic such as firmware, part of an operating system, part of an application program; etc., or some combination of hardware and software logic that is accessible by the processor and configured to cause the processor to perform some functionality upon execution by the processor. Software logic may be stored on local and/or remote memory of any memory type, as known in the art. Any processor known in the art may be used, such as a software processor module and/or a hardware processor such as an ASIC, a FPGA, a central processing unit (CPU), an integrated circuit (IC), a graphics processing unit (GPU), etc.

As mentioned elsewhere above, an IT environment may include a set of applications deployed on top of IT components, e.g., server systems, compute networks, networking devices, computer devices in communication with at least one other computer device, etc. Furthermore, these applications may include any known type of business application which may be managed by an administrator of a business. Within such an IT environment, the IT components may be broken down into sub-groups of IT components that are each associated with and managed by different actors, e.g., clients, administrators, businesses, etc.

IT environments are constantly changing, e.g., due to human interactions, due to system-to-system interactions, due to security threats to one or more deployments in an IT environment being developed, etc. To ensure that an IT environment remains secure, a set of IT security policies is typically applied on the IT environment to minimize security risks that a wrong or weak configuration can bring or enable within the IT environment that may as a result be exploited by attackers.

These security policies intend to provide a customized level of security that is valuable to an IT infrastructure aligned with a business that a company runs. It is not simple to identify all the security issues that an IT infrastructure can bring to business applications, e.g., malware, customer data being accessible to unauthorized parties, phishing attacks, governing laws, etc. Furthermore, depending on the security issue and how the issue can potentially be exploited, the risk these issues pose to such applications and/or infrastructure may be relatively lower or relatively higher. Due to this, companies aim to implement IT security policies that ensure security risks are kept low, and that do not impact business operations of the company.

To implement these security policies, it is helpful to understand an entire landscape of the IT environment, e.g., the technologies of the IT environment, products that the IT environment includes, the industry, a purpose of the business applications, etc. With this information, an IT security policy may be selected and applied to one or more deployments within the IT environment. However, a problem with this approach is that this is a time-consuming activity, not to mention that there is often a lack of understanding from clients, application owners and IT staff about the real impact of changing an IT security setting in the IT environment. Clients typically understand the need for and importance of an IT security policy. However, when it comes to deploying a security policy, there are typically numerous roadblocks are typically raised. Accordingly, sometimes the security policy is sporadically deployed, as doing so consumes a considerable amount of resources, e.g., effort, costs, time, processing potential, etc., from an entire organization. Accordingly, there is a longstanding need to deploy a predictable method to map and identify an entire IT landscape, analyze IT information to determine how to align with a client's business applications, and build an IT security policy that can meet the client's security needs and that can be implemented without any burden to the client.

In sharp contrast to the deficiencies described above, the techniques of various embodiments and approaches described herein intend to change and transform the way an IT security policy is evaluated and implemented. Machine learning algorithms are implemented to verify the client environment, analyze executable IT security actions, and evaluate the risk and effort associated with each of such actions. Uncertainty levels of the client are then identified, and an IT policy that may be applied based on client appetite for risks is proposed. Using these techniques, it is possible to drastically reduce the time consumed in the application of an IT security policy that was not built for a client's business, and as a result save the client money while mitigating IT interventions. For context, a "security policy" may be defined as a set of hardening parameters that can be implemented and configured in any type of technology system in an IT environment, e.g., password lengths to access applications on a cellular phone. Accordingly, in some approaches, the security policy is a document that describes the technical measurement and controls that can be implemented in a certain environment in order to guarantee a certain level of security for the data and the system. Furthermore, "uncertainty" of a security policy may be defined where a client purchases a security policy and does not know the risks of applying certain parameters, e.g., such as compatibility of the policy with existing features of an application.

Figure 3:
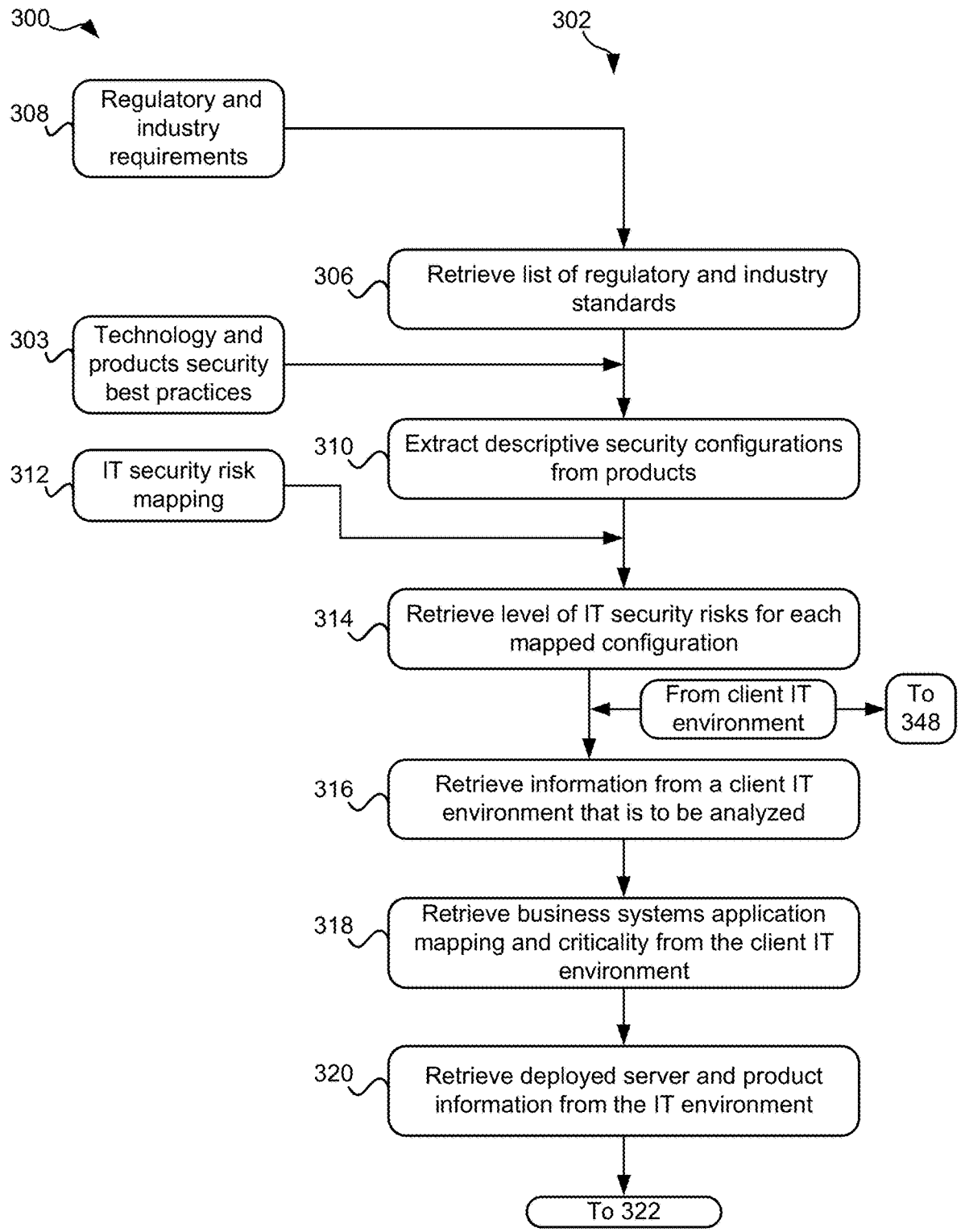
FIG. 3 is a flowchart of a method, in accordance with one embodiment of the present invention.
Figure 3:
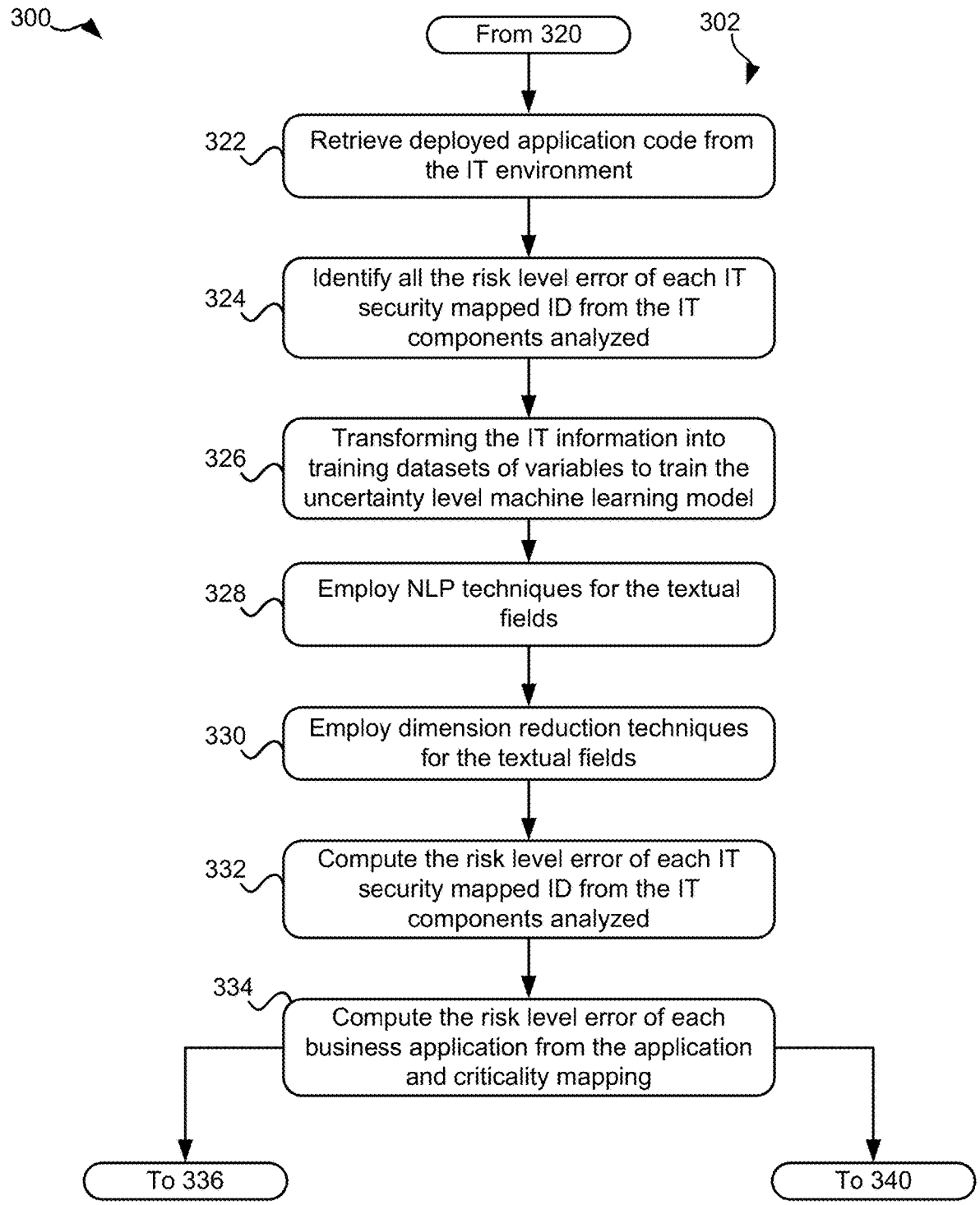
Figure 3:
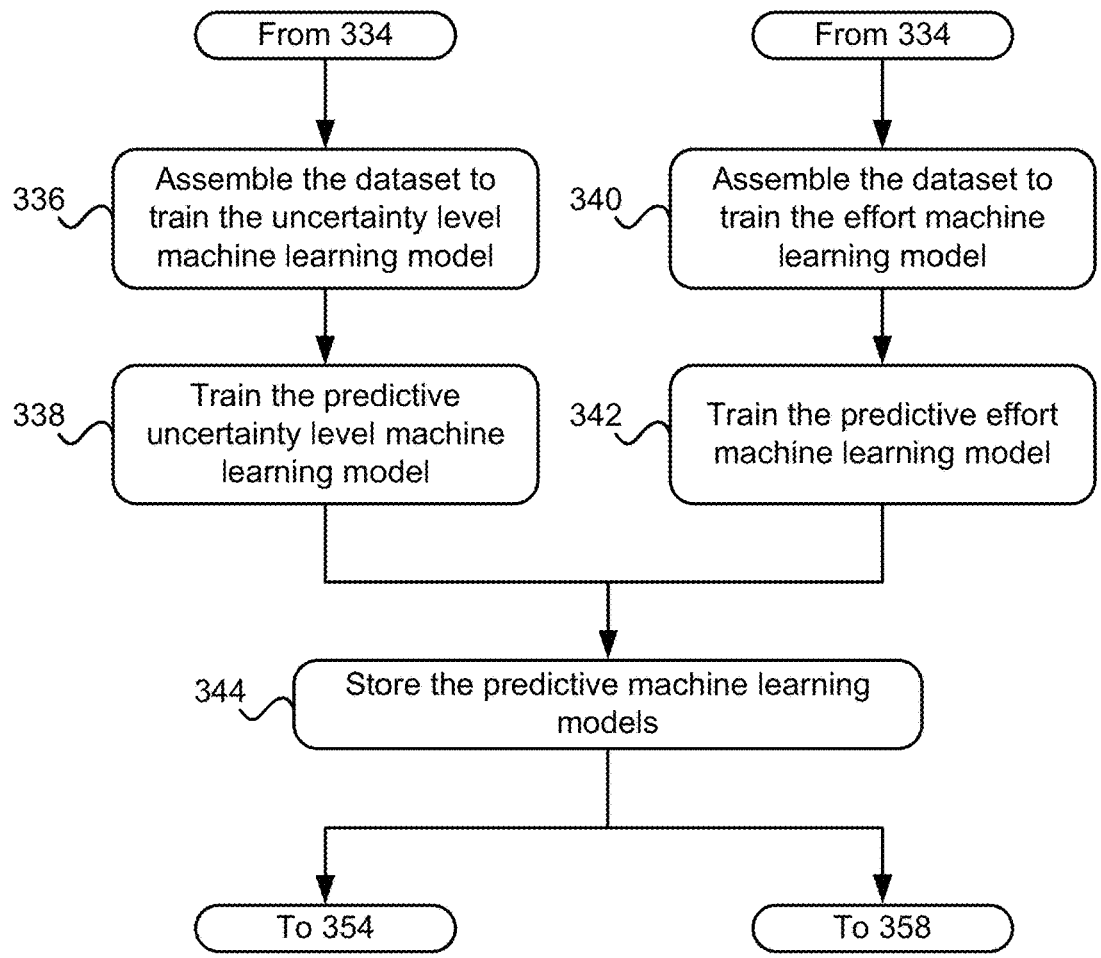
Figure 3:
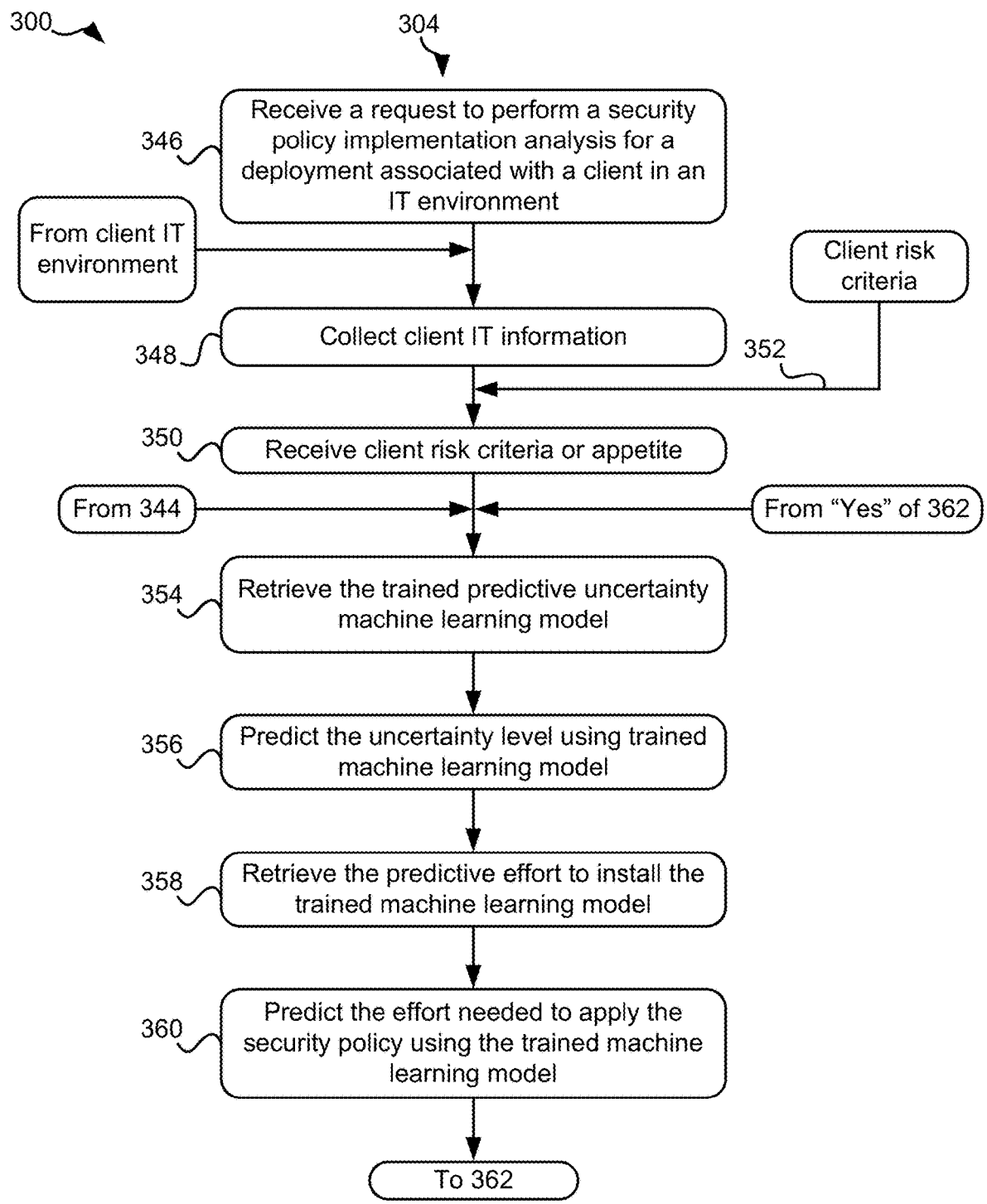
Figure 3:
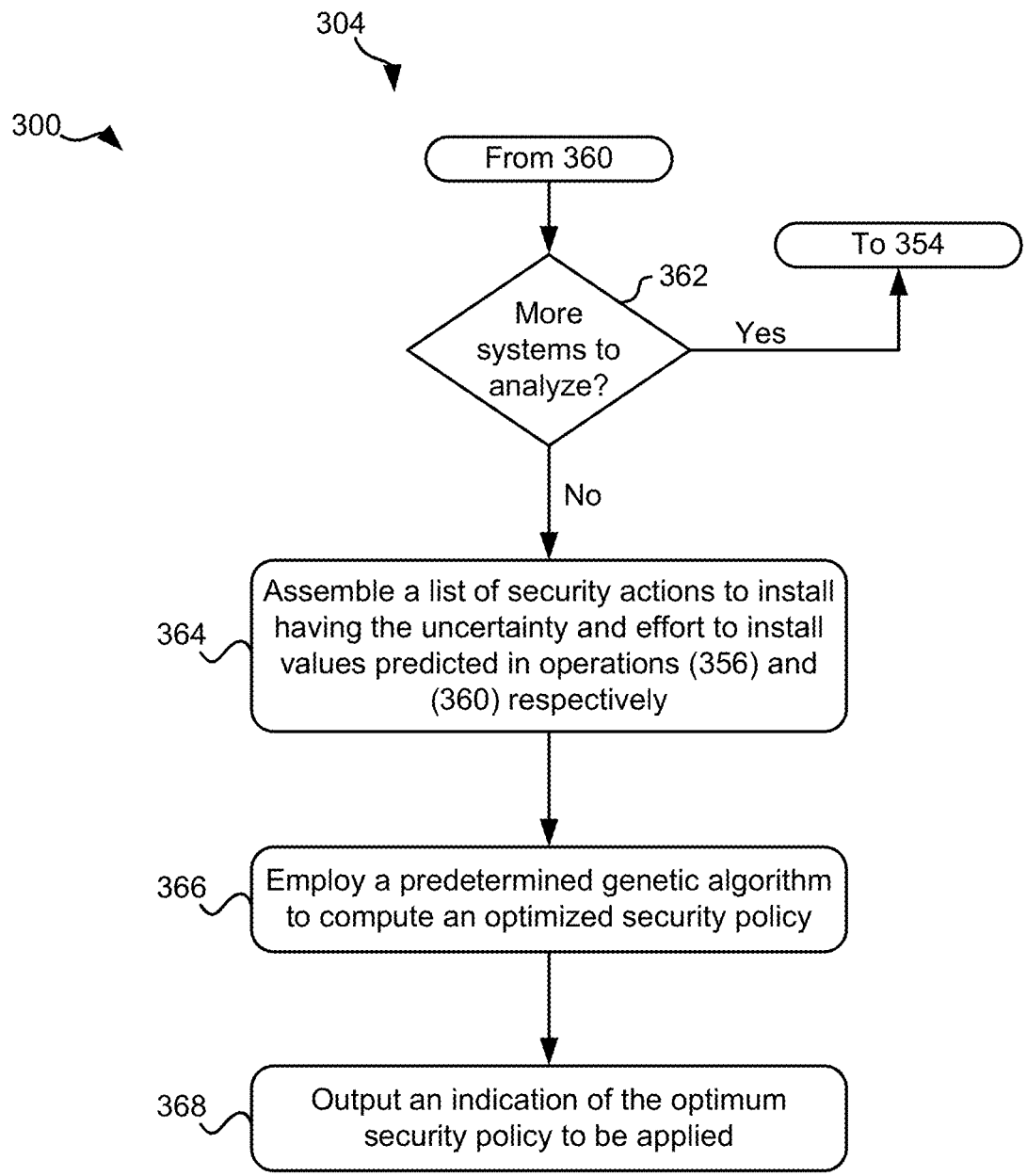

Now referring to FIG. 3, a flowchart of a method 300 is shown according to one embodiment. The method 300 may be performed in accordance with the present invention in any of the environments depicted in FIGS. 1-6, among others, in various embodiments. Of course, more or fewer operations than those specifically described in FIG. 3 may be included in method 300, as would be understood by one of skill in the art upon reading the present descriptions.

Each of the steps of the method 300 may be performed by any suitable component of the operating environment. For example, in various embodiments, the method 300 may be partially or entirely performed by a computer, or some other device having one or more processors therein. The processor, e.g., processing circuit(s), chip(s), and/or module(s) implemented in hardware and/or software, and preferably having at least one hardware component may be utilized in any device to perform one or more steps of the method 300. Illustrative processors include, but are not limited to, a central processing unit (CPU), an application specific integrated circuit (ASIC), a field programmable gate array (FPGA), etc., combinations thereof, or any other suitable computing device known in the art.

It may be prefaced that method 300 includes novel techniques for computing a recommended security policy based on a calculated uncertainty and a predicted amount of resource consumption each associated with applying the security policy. These techniques may be deployed as a service and/or incorporated in a security product. More specifically, these techniques include automatically evaluating and identifying such an IT security policy. A predictive machine learning model is also used to identify the uncertainty to deploy a security action or fix. Furthermore, a predictive machine learning model is used to determine the effort needed and time required to apply the security fix, and a genetic algorithm is used to compute an optimized IT security policy that may be indicated to a user device of a client. As will be described in greater detail elsewhere herein, benefits of these techniques include a reduction in time spent by an infrastructure support team, functional team, and business areas analyzing the impacts of each IT security policy action. This is because the uncertainty is calculated and provided to the user before the user purchases or instructs application of such a policy. These techniques may additionally and/or alternatively be used to properly evaluate costs and efforts consumed in and associated with deploying IT security policies.

It may also be prefaced that method 300 includes a training portion 302 for training machine learning algorithm(s), and more specifically a training phase for patches related machine learning models. Method 300 further includes an application portion 304 for applying the trained machine learning algorithm(s).

Referring first to the training portion 302 in FIG. 3, operation 306 includes retrieving a list of regulatory and industry standards. More specifically, such a retrieval is performed on an external source that lists all regulatory and industry standards that may apply to a deployment of a client that requests a security policy implementation analysis. The deployment of a client may be one or more applications and/or physical systems of the IT environment that are managed and offered as, e.g., one or more IT security policies currently deployed in the IT environment, a business solution, a product interface, a storage platform, computing resources, etc. The deployment of the client may have one or more IT security policies that protect the deployment. Furthermore, in some approaches, the IT environment includes a plurality of deployments. Each deployment within this plurality may be protected by one or more IT security policies, which may be specifically designed for one or more of the deployments. At least one IT security policy may be applied to a plurality of the deployments, in some approaches. It is important to note that these IT security policies may cause one or more IT security actions to be performed in order to ensure that the deployment operates according to the regulatory and industry standards of the list. With this context, the retrieved list of regulatory and industry standards may, in some preferred approaches, be regulatory and industry standards applicable to client deployments in the IT environment. In some other approaches, because the training portion 302 of method 300 is performed for training machine learning models, one or more of the regulatory and industry standards may not be applicable to client deployments.

The list may be an external database of regulatory and industry standards, that is in some approaches populated by regularity and industry requirements 308 received from one or more resources, e.g., laws, statutes, legislation, administrator requirements, client requests, communication forums, web sites, etc. According to some approaches, the list of regulatory and industry standards may include unstructured textual fields. For example, in one of such approaches, the unstructured textual fields may include a title and description which provide the purpose and industry/area of a regulatory standard. In another one of such approaches, the unstructured textual fields may include a list, e.g., of predetermined key security measures. In yet another one of such approaches, the unstructured textual fields may include detailed security implementations. Such implementation may provide a detailed description of one or more security and regulatory actions that are to be deployed in order to ensure compliance with one or more of the standards. According to some other approaches, the list of regulatory and industry standards may additionally and/or alternatively include structured data. For example, in one of such approaches, the structured data may be a product and version which provide information about the version of the standard.

Operation 310 includes extracting descriptive security configurations from products. Note that the information of operation 310 may be extracted from a known source of technology and product security best practices 303. In this step, information about IT security configurations available for each product of the IT environment are extracted. In some preferred approaches, the information that is extracted includes unstructured textual fields and/or structured data. For example, the unstructured textual fields may include, e.g., title and description which provides information about the product, a list of key security measures, detailed security implementations which provide a detailed description of security configuration settings, etc. The structured data may, in some illustrative approaches, include, e.g., a product, a version and security identification.

An IT security risk mapping may be received, e.g., see operation 312. In some approaches, the IT security risk mapping is received from a security risk management engine of a type that would become apparent to one of ordinary skill in the art upon reading the descriptions herein. A level of IT security risks may be retrieved for each mapped configuration, e.g., see operation 314. In this retrieval step, a retrieval may be performed for each IT security action and the level (or criticality) of impact of each risk that can potentially occur in an IT environment. For example, a File Transfer Protocol (FTP) being enabled in an IT environment may be considered a relatively high risk action while such a protocol being disabled may be considered a relatively low risk action. These levels of IT security risks may be retrieved from, e.g., unstructured textual fields that are identified to include one or more security risk descriptions and levels.

Training the machine learning models may additionally and/or alternatively include retrieving IT information associated with a deployment of a training IT environment. In some other approaches, training the machine learning models may additionally and/or alternatively include retrieving IT information from an IT environment that the trained models will be applied in, e.g., see the application portion 304. For example, in at least one of such approaches, information may be received from a client IT environment, e.g., see "From client IT environment." In another example, information is additionally and/or alternatively retrieved from a client IT environment that is to be analyzed, e.g., see operation 316. In some approaches, this information is retrieved from client IT tools. The information may include information related to business applications, IT systems deployed per application, products deployed, system configurations, a criticality matrix, application code deployed on each system, etc. This information may, in some approaches, be retrieved from unstructured textual fields. For example, one or more of these unstructured textual fields may include component name and configurations settings which may detail a list of configurations settings related to security and/or IT security policies available to be deployed in the IT environment, e.g., such as in one or more deployments of the IT environment. This information may, in some other approaches, be retrieved from structured data, which may include a list of business applications, applications, IT components and products deployed for each component within the IT environment, etc.

Retrieving the IT information in order to train the machine learning models may additionally and/or alternatively includes retrieving application mapping associated with at least one deployment of the training IT environment. For example, operation 318 includes retrieving business systems application mapping and criticality from the client IT environment. This retrieval operation may include retrieving a list of business applications installed in the IT environment, and a criticality of each application and mapping of all IT components deployed per application. This information may, in some approaches, be retrieved from unstructured textual fields, e.g., title and description such as a list of business applications and criticality matrix. In some other approaches, this information may, in some approaches, be retrieved from structured data, e.g., a mapping list of business systems, applications and IT components, etc.

Server and product information associated with the deployment may, additionally and/or alternatively, be received in order to train the machine learning models. For example, operation 320 includes retrieving server and product information deployed in the IT environment. Here, an inventory list of IT components installed in a client portion of the environment, e.g., the deployment of the client, and details of each product installed therein is retrieved. This information is, in some approaches, retrieved from unstructured textual fields, e.g., a title and description which may provide information about the product, a list that includes key security measures, detailed security implementations which may provide a detailed description of each security configuration setting, etc. This information is, in some other approaches, retrieved from structured data, e.g., a product and/or a version and support package which may provide information about the versions of the products, etc. Application code associated with a deployment in the IT environment may additionally and/or alternatively be retrieved in order to train the machine learning models. For example, operation 322 includes retrieving deployed application code from the IT environment. More specifically, operation 322 includes retrieving all the application codes deployed on each server to identify programming practices that deviate from a predetermined collection of best security practices, e.g., such as fixed IP address or credentials, in some approaches. The application code may include unstructured textual fields such as programing code which may identify hard coded programming steps that are not considered a predetermined best security practice. The application code may additionally and/or alternatively include structured data such programs that are associated with each IT component.

Method 300 may, in some approaches, include computing risk level errors from components and applications of the of the deployment in the IT environment. For example, operation 324 includes identifying all the risk level error of each IT security mapped ID from the IT components analyzed. In this step, the risk level error of each IT security action related to an IT component is identified. For example, a proper filesystem chmod defined and/or a level of risk if it is widely open, e.g., susceptible to more than a predetermined threshold of risk, may be determined.

The IT information may be transformed into training datasets for training the machine learning models. For example, operation 326 includes transforming the IT information into training datasets of variables to train at least one of the machine learning models, e.g., preferably an uncertainty level machine learning model. In some approaches, this transformation may include computing variables to train the uncertain level machine learning model by computing a risk level error of each IT security action related to an IT component, e.g., such as a proper filesystem chmod defined and a level of risk if it is widely open.

Operation 328 includes employing natural language processing (NLP) techniques for the textual fields. More specifically, in this step, a predetermined natural language process (NLP) algorithm may be used to remove any insignificant words from the unstructured textual fields depicted in IT information of operation 310. Thereafter, a predetermined bag-of-words process is preferably employed to obtain a vector representation of the unstructured textual information of a workflow. At this point, the dataset has the vector representation and the structured data as the input, and outputs that include an acceptance and a time to install variables, e.g., such as installed for deploying an IT security policy.

Dimension reduction techniques that would become apparent to one of ordinary skill in the art upon reading the descriptions herein may be employed for the textual fields, e.g., see operation 330. In some approaches, these may include dimension reduction techniques of a space formed by the sparse matrix of bag-of-words vectors. This step is crucial to combining the vector representation obtained in operation 328 with structured variables in order to avoid a loss of relevance of the structured fields in face of the high dimensionality of the vector representation of the unstructured textual fields. In one potential approach, an application of the dimension reduction techniques may include a principal component analysis (PCA) and/or a latent semantic analysis (LSA).

In operation 332, risk level error of each IT security mapped ID from the IT components analyzed is computed. In this step, the risk level error of each IT security actions related to every component analyzed is preferably computed.

A risk level error of each business application, e.g., from the application and criticality mapping, may additionally and/or alternatively be computed, e.g., see operation 334. More specifically, in some approaches, the risk level error of each business application according to the risk level identified in operation 332 and the criticality matrix may be computed.

The dataset to train the uncertainty level machine learning model is assembled, e.g., see operation 336. In this step, the dataset may be formed by all the regulatory standards retrieved in operation 306, technology and security best practices per technology and related risks data retrieved in operation 310 and operation 314, IT environment information data retrieved in operations 316, 318, 320, and 322 and computed in operations 324, 326, 332 and 334. This dataset may be characterized by having an input of: the unstructured text fields retrieved in operation 306, 310, 314 and 316, and transformed in operations 328 and 330, and an input of: the structured data retrieved in operations 314, 316, 318, 320, and 322.

Operation 338 includes training the predictive uncertainty level machine learning model to analyze IT information, e.g., using the dataset assembled in operation 336. In some preferred approaches, a supervised machine learning technique may be employed to infer the predictive uncertain machine learning model that maps the input and output variables described in operation 336. Several potential approaches of the supervised machine learning techniques are naïve bayes, support vector machines (SVM), and standard neural networks (multi-layer perceptron), assuming that the input and output variables are either discrete and countable or can be converted to this format. As a result of the training, the predictive uncertainty level machine learning model is preferably trained for calculating uncertainty of effects that applying a security policy to a deployment is capable of causing.

Operation 340 includes assembling a dataset to train the effort machine learning model. In some approaches, the dataset is formed by all the regulatory standards retrieved in operation 306, technology and security best practices per technology and related risks data retrieved in operations 310 and 314, client IT environment information data retrieved in operations 316, 318, 320, and 322, and computations in operations 324, 326, 332 and 334. This dataset is characterized as having as an input that includes the unstructured text fields retrieved in operations 306, 310, 314, and 316 and transformed in operations 328 and 330, and an input that includes the structured data retrieved in operations 314, 316, 318, 320, and 322.

A second of the machine learning models is trained using the training dataset developed in operation 340, e.g., see operation 342. In some approaches, this training may employ a supervised machine learning technique to infer a predictive acceptance machine learning model that maps the input and output variables described in operation 340. Possible approaches of the supervised machine learning techniques are support vector machines (SVM) and standard neural networks (multi-layer perceptron), assuming that the time to install output variable is continuous. The second of the machine learning models is a predictive effort machine learning model trained for predicting resource consumption that results from applying a security policy to a deployment.

Operation 344 includes storing the trained machine learning models to a predetermined database, e.g., a database of the IT environment. In some approaches, the trained machine learning models are stored in a predetermined repository to be later used in the application portion 304 of method 300 in which the trained machine learning algorithm(s) are applied to determine a security policy for a deployment in the IT environment.

It should be noted that in some approaches, during a training portion 302 of method 300, the machine learning models may be developed (at least in part) using a supervising specialist, e.g., with one or more confirmations of a subject matter expert (SME) until a determination is made that the machine learning models are able to exceed a predetermined accuracy threshold for analyzing IT information of a client to compute a security policy for a first deployment. Reference will now be made below to the application portion 304 of method 300 which includes various operations for applying the trained machine learning algorithms.

Operation 346 includes receiving, from a user device used by a first client of an IT environment, a request to perform a security policy implementation analysis for a first deployment associated with a first client in an IT environment. In some approaches, the first deployment and/or the IT environment may be the ones the machine learning models were trained based on. The first deployment may, in some approaches, include at least one application that is run on at least one device such as a server in the IT environment. IT information, e.g., IT information associated with at least the first deployment, may be collected, e.g., see operation 348. In some other approaches, the IT information may be received with the request, e.g., see operation 352, received subsequent to issuing a query to the user device, accessed in a predetermined database, etc. In some preferred approaches, this IT information is of a same type as the information described in one or more of operations 318, 320 and 322, and/or using similar techniques described in such operations. An indication, e.g., client IT risk criteria or appetite, of a degree of risk that the first deployment is currently capable of supporting in the IT environment, e.g., accepting during operation of one or more business applications deployed in the first deployment in the IT environment, may be received, e.g., see operation 350. For example, such client IT risk criteria or appetite may be a level, e.g., high, medium and low, where medium has a relatively higher risk criteria or appetite than low, and high has a relatively higher risk criteria or appetite than medium.

Operation 354 includes retrieving the predictive uncertainty machine learning model trained in operation 338. The trained predictive uncertainty machine learning model is applied to analyze the IT information of the deployment of the first client to compute a security policy for the first deployment. More specifically, operation 356 includes predicting the uncertainty level by applying, e.g., executing, the trained predictive uncertainty machine learning model. For context, "uncertainty" preferably correlates to a calculated uncertainty of effects that applying an IT security policy to the first deployment is capable of causing. For example, these effects may, in some approaches, include, e.g., an unknown amount of processing resources that applying the security policy would cause, a collateral effect that the applying the security policy would cause, etc. The effects that applying the security policy to the first deployment is capable of causing may additionally and/or alternatively include, e.g., a collateral effect that the applying the security policy would cause to customer features offered by applications of the first deployment, private customer information unintentionally becoming accessible, a loss of access event such as to an application via a login, a loss of functionality of components of the first deployment, etc. Accordingly, in some approaches, the uncertainty level may include, e.g., deeply uncertain, uncertain, risky, clear, etc., and based on inputting at least some of the IT information into the trained predictive uncertainty machine learning model, the uncertainty level is produced as an output of the trained predictive uncertainty machine learning model. It should be noted that IT security policies having relatively higher uncertainty, e.g., deeply uncertain, are predicted to have a potential for causing a greater degree of unknown effect to the deployment in the IT environment as a result of being applied therein, while IT security policies having relatively lower uncertainty, e.g., clear, are predicted to have a potential for causing a lesser degree of unknown effect to the deployment in the IT environment as a result of being applied therein.

A second machine learning model, e.g., the trained predictive effort machine learning model, trained in operation 338 may additionally and/or alternatively be retrieved, e.g., see operation 358. Furthermore, the trained predictive uncertainty machine learning model may be applied to analyze the IT information of the deployment of the first client to compute a security policy for the first deployment. More specifically, operation 360 includes predicting the effort, e.g., an amount of resources of the first deployment, that applying the security policy to the first deployment using the trained machine learning model would consume. The security policy may additionally and/or alternatively be computed based on this predicted amount of resources of the first deployment that applying the security policy to the first deployment would consume. This amount of resources may be predicted by applying, e.g., executing, the trained predictive effort machine learning model. For example, these resources may, in some approaches, include, e.g., processing resources that incorporating updating an update to an existing security policy in the IT environment would consume, an amount of time that applying the security policy would take, an extent of oversight and/or time of an administrator of the deployment would be called for, an amount of power that applying the security policy in the IT environment would consume, an amount of additional physical resources that the deployment would need in order to apply the security policy in the IT environment, an amount of logical resources that the deployment would need in order to apply the security policy in the IT environment, costs incurred by the first client, subject matter expert (SME) consultation, processing operations being devoted to troubleshooting operations, time consumed in updating applications associated with the first deployment, etc. Accordingly, in some approaches, the predicted amount of resources may include, e.g., more resources than are currently available in the deployment, about an amount of resources than are currently available in the deployment, less resources than are currently available in the deployment, etc., and based on inputting at least some of the IT information into the trained predictive effort machine learning model, the predicted amount of resources is produced as an output.

The computed security policy may include any known type of security parameter recommendations for IT environments that would become apparent to one of ordinary skill in the art upon reading the descriptions herein. For example, the security policy may include and thereby recommend, e.g., closing physical and/or logical ports, increasing access credential strengths such as by increasing a required password length, requiring devices to adhere to predetermined security protocols, disabling predetermined protocols, modifying an encryption standard, setting a renewal countdown for access credentials once access is granted, etc. It should be noted that in some preferred approaches, the computed security policy recommends security parameter updates that mitigate one or more current threats to the IT environment while minimizing the amount of effort that applying the computed security policy takes. However, this ideal balance of enhanced security while minimizing the effort is not always possible. This is because, the computation of the security policy preferably takes the aforementioned indication, e.g., IT risk criteria or appetite, of the degree of risk into account. For example, for a client having a deployment with an indicated relatively very low appetite for risk, the computed security policy may recommend relatively extensive additions of security protocols despite such additions also being predicted to have a relatively large effort to apply the additions. According to a more specific example, it may be assumed that the computed security policy includes a suggested modification of password lengths to be ten characters, e.g., where the password length is currently only four characters, and that applications of the deployment are programmed to only handle passwords having no more than eight characters. It may also be assumed that it is determined that the client associated with the deployment has a relatively very low appetite for risk. Because the applications of the deployment are programmed to only handle passwords having no more than eight characters, application of the computed security policy would be expected to consume a relatively large amount of processing as the applications would need to be modified to handle more than eight characters. Despite this extensive amount of effort predicted to be needed for the application of the computed security policy, the computed security policy includes the suggestion to enforce password lengths to be ten characters in order to, e.g., satisfy one or more IT security rules considered by the trained machine learning models, and furthermore satisfy the relatively very low appetite for risk. In contrast, assuming the same facts but that the client has a relatively very high appetite for risk, the computed security policy would likely not include the suggestion to enforce password lengths to be ten characters because the client's appetite for risk is much higher, e.g., potentially indicating that the client accepts potentially not satisfying the IT security rules. In some approaches, a plurality of parameters of the calculated security policy may additionally and/or alternatively be tiered according to the amount of effort that applying the calculated security policy is predicted to consume.

Decision 362 includes determining whether more systems are to be analyzed. Such a decision may be made in some approaches in which multiple systems within the IT environment are considered for determining in order to compute the security policy, e.g., a plurality of different deployments, a plurality of systems in the first deployment, etc. In response to a determination that more systems are to be analyzed, the method continues to operation 354, e.g., see "Yes" logical path of decision 362. In contrast, in response to a determination that no more systems are to be analyzed, the method continues to operation 364, e.g., see "No" logical path of decision 362.

In some approaches, the security policy is computed from a plurality of potential security actions identified from results of applying the trained machine learning models. For example, operation 364 includes assembling a list of security actions to install having the uncertainty and effort to install values predicted in operations 356 and 360 (respectively). These potential security actions may be refined, e.g., filtered before being output. For example, the potential security actions may, in some approaches, be used as an input for a predetermined genetic algorithm used in the computation of the security policy, e.g., see operation 366.

Operation 368 includes outputting an indication of the optimum security policy to be applied. In some preferred approaches, the indication of the security policy is output for display in a dashboard on a display of a user device of the first client. Such a dashboard will be described in greater detail elsewhere herein, e.g., see FIG. 6.

The indication of the security policy may, in some approaches, include a plurality of recommended security parameters. Each of the recommended security parameters may be tiered, e.g., into a tier of a plurality of different tiers, according to how the recommended security parameter conforms to the degree of risk. For example, security parameters that are tiered into a first tier are least recommended as a result of the parameters conforming relatively less to the degree of risk than recommended security parameters that are tiered into a second tier and recommended security parameters that are tiered into a third tier (most recommended). In such an example, the recommended security parameters that are tiered into a third tier are most recommended as a result of the parameters conforming relatively more to the degree of risk than recommended security parameters that are tiered into a first tier and recommended security parameters that are tiered into a second tier.

The indication of the security policy may additionally and/or alternatively include a breakdown of a plurality of applications associated with the IT information within the first deployment. More specifically, in some of such approaches, the breakdown may include, for each of the applications, a security competency issue, and an issue specific uncertainty level. The calculated uncertainty of effects that applying the security policy to the first deployment is capable of causing is based on each of the issue specific uncertainty levels. This ensured that resources on the client-end are provided application specific solutions, e.g., based on issues and uncertainties, with context as to why the parameters of the computed security policy would improve performance within the deployment. This may be used by these client-end resources to determine one or more third-party companies and/or services, e.g., that offer IT environment security services and packages, to contract with in order to adopt the indicated security policy. In contrast, such a determination may additionally and/or alternatively be made for the client and results of such a determination may be provided to the client. For example, an optional operation of method 300 includes determining an IT service provider that offers a service that has at least a predetermined degree of similarity with the computed security policy. An indication of the determined IT service provider may be output to the user device, e.g., in a same or different outputting operation than the outputting of the security policy.

Various benefits are enabled as a result of utilizing the techniques described herein for computing a recommended security policy based on a calculated uncertainty and a predicted amount of resource consumption each associated with applying the security policy. For example, performance of computer architectures within the deployment of the IT environment improves for several reasons. First, security policies that suit the needs of the deployment, e.g., as determined from analyzed IT information, are identified. These policies would not otherwise be realized without relatively extensive processing operations where such an analysis is not performed, e.g., trial by error. Furthermore, security audits that would otherwise be performed to determine whether the current policies are accurately preventing threats from infiltrating deployments within the IT environment are eliminated, which results in a direct reduction to processing performed in the IT environment. This is because clients are able to instead apply the computed security policy that is pre-ensured to be tailored specifically for deployments associated with the client in the IT environment, e.g., according to a risk appetite of the client, based on IT information associated with the deployment, etc. It should also be noted that use of training and applying machine learning models to compute a recommended security policy based on a calculated uncertainty and a predicted amount of resource consumption has heretofore not been considered in conventional IT environments, despite there being a longstanding and unmet need to deploy a predictable method to map and identify an entire IT landscape, analyze IT information to determine how to align with a client's business applications, and build an IT security policy that can meet the client's security needs that can be implemented without any burden to the client. Accordingly, the inventive discoveries disclosed herein proceed contrary to conventional wisdom.

Figure 4:
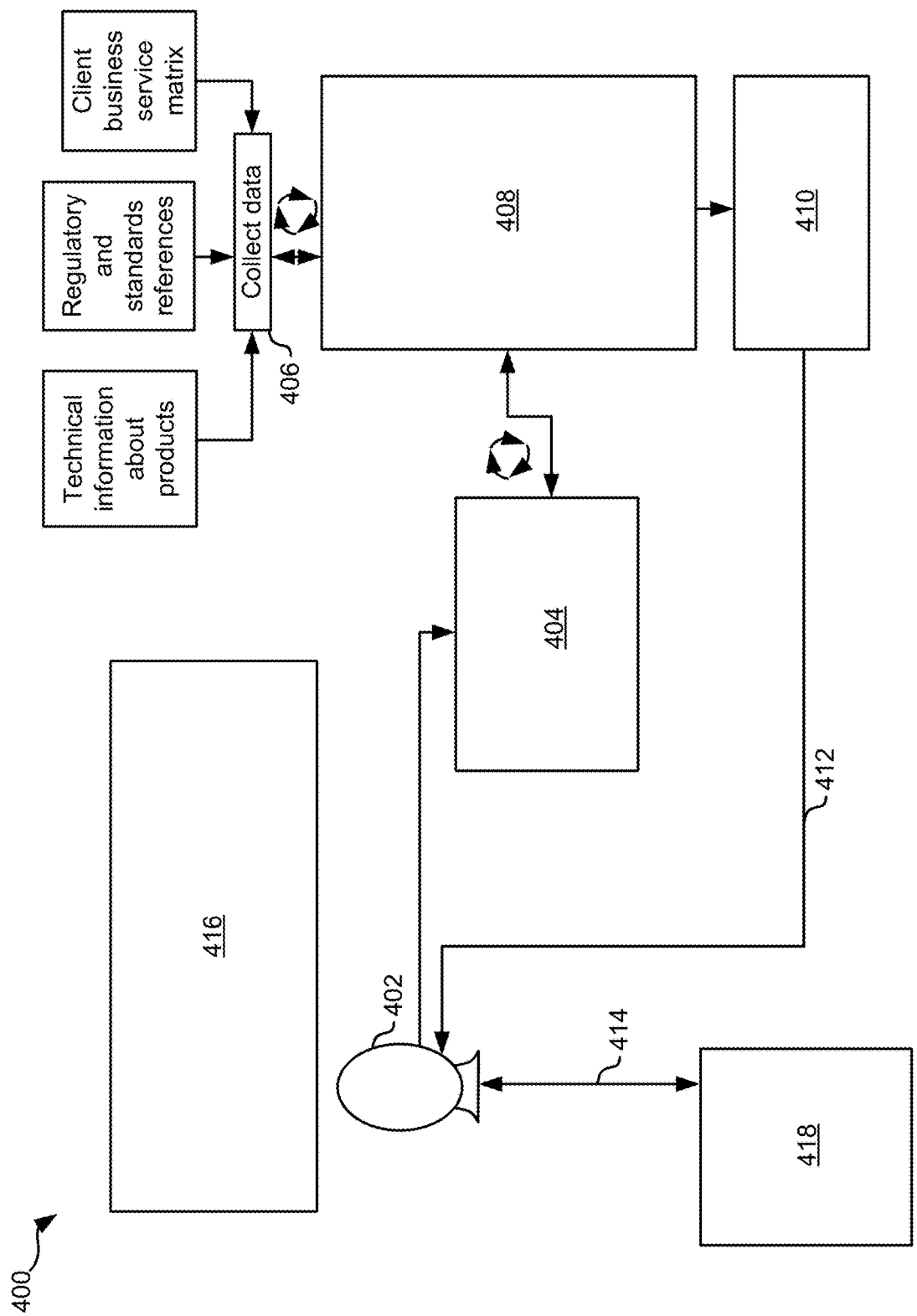
FIG. 4 is a flowchart of a method, in accordance with one embodiment of the present invention.

Now referring to FIG. 4, a flowchart of a method 400 is shown according to one embodiment. The method 400 may be performed in accordance with the present invention in any of the environments depicted in FIGS. 1-6, among others, in various embodiments. Of course, more or fewer operations than those specifically described in FIG. 4 may be included in method 400, as would be understood by one of skill in the art upon reading the present descriptions.

Each of the steps of the method 400 may be performed by any suitable component of the operating environment. For example, in various embodiments, the method 400 may be partially or entirely performed by a computer, or some other device having one or more processors therein. The processor, e.g., processing circuit(s), chip(s), and/or module(s) implemented in hardware and/or software, and preferably having at least one hardware component may be utilized in any device to perform one or more steps of the method 400. Illustrative processors include, but are not limited to, a central processing unit (CPU), an application specific integrated circuit (ASIC), a field programmable gate array (FPGA), etc., combinations thereof, or any other suitable computing device known in the art.

The flowchart of FIG. 4 includes a client that has a longstanding need 416. For example, the client has a need for a predictable method to be run on a client IT environment 404 in order to know in advance a level of effort, e.g., confidence, that applying supported security parameters consumes, and in order to determine what is a best overall policy based on the client's security risk appetite. Running a method 408 using the techniques described herein, e.g., see various operations of method 300, enable cost savings, time savings, and drastically reduce the potential impacts that threats are able to cause to an availability and integrity of the client IT environment 404. For example, running the method may include collecting IT environment information, e.g., see operation 406. This IT environment information may include, e.g., technical information about products, regulatory and standards references, a client business service matrix, etc. The method may additionally and/or alternatively include building bigdata in a non-relational database, performing machine learning that will apply the predictable method, determination of risk confidence according to the method analysis, etc. Furthermore, the method may include applying trained machine learning models to analyze the IT information of the client to compute a security policy 410 that is computed based on a calculated uncertainty of effects that applying the security policy to the first deployment is capable of causing and/or a predicted amount of resources of the first deployment that applying the security policy to the first deployment would consume. An indication of the security policy is output, e.g., see operation 412, for display in a dashboard on a display of a user device of the client 402. The indication may be used to determine an IT service provider 418 that offers a service that has at least a predetermined degree of similarity with the security policy. For example, the client 402 may decide to contact, e.g., see operation 414, with a third party, e.g., IT service providers, with security policy offerings that are similar to those determined using method 400.

Figure 5:
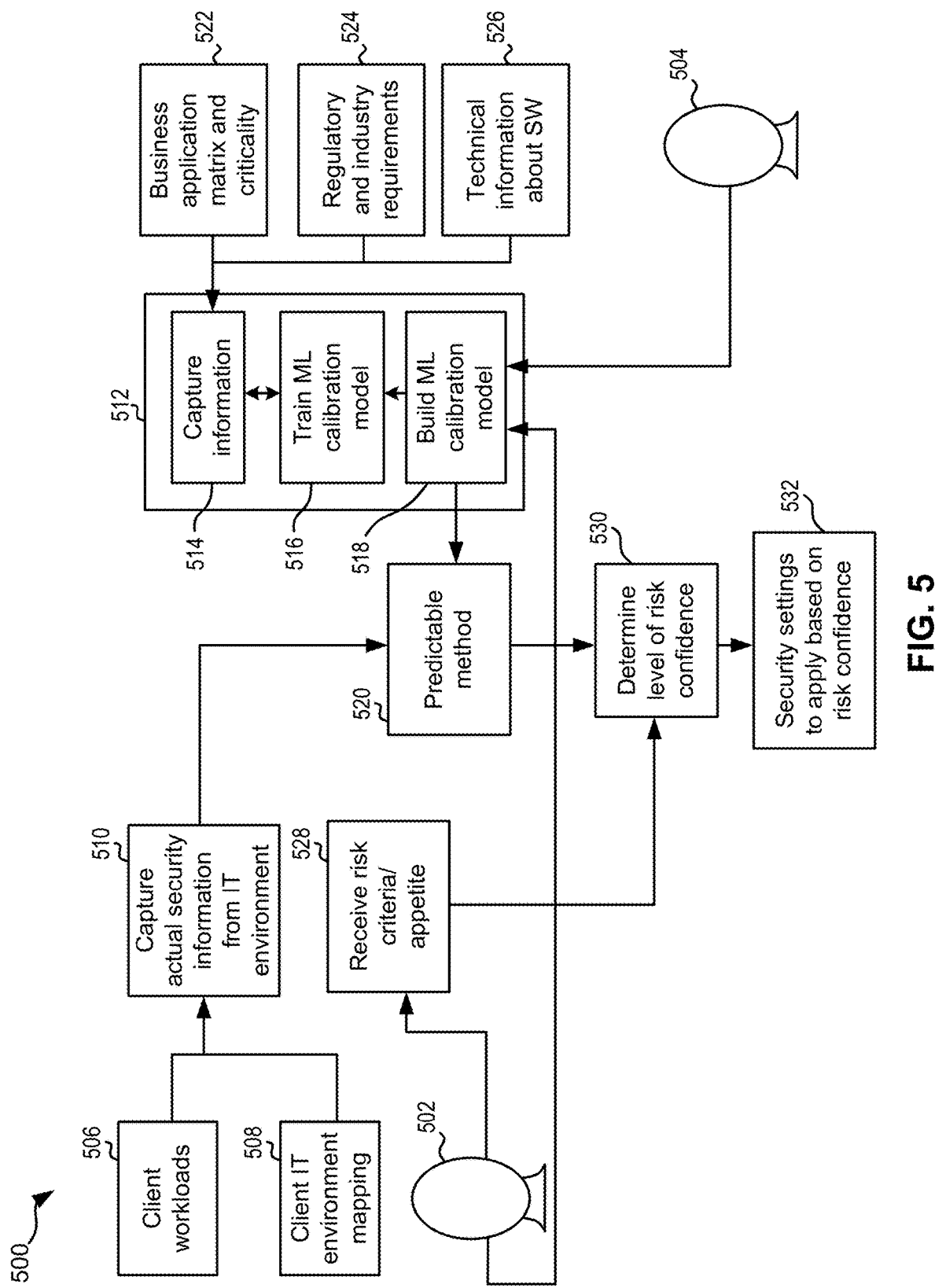
FIG. 5 is a flowchart of a method, in accordance with one embodiment of the present invention.

Now referring to FIG. 5, a flowchart of a method 500 is shown according to one embodiment. The method 500 may be performed in accordance with the present invention in any of the environments depicted in FIGS. 1-6, among others, in various embodiments. Of course, more or fewer operations than those specifically described in FIG. 5 may be included in method 500, as would be understood by one of skill in the art upon reading the present descriptions.

Each of the steps of the method 500 may be performed by any suitable component of the operating environment. For example, in various embodiments, the method 500 may be partially or entirely performed by a computer, or some other device having one or more processors therein. The processor, e.g., processing circuit(s), chip(s), and/or module(s) implemented in hardware and/or software, and preferably having at least one hardware component may be utilized in any device to perform one or more steps of the method 500. Illustrative processors include, but are not limited to, a central processing unit (CPU), an application specific integrated circuit (ASIC), a field programmable gate array (FPGA), etc., combinations thereof, or any other suitable computing device known in the art.

It may be prefaced that method 500 more specifically illustrates a representation of an architecture overview of operations for training machine learning models and applying the trained machine learning models to analyze the IT information of the first client to compute a security policy for a deployment of an IT environment. It may be further prefaced that method 500 includes capturing actual security settings from client IT environment and client risk criteria appetite to determine the level of risk confidence. Furthermore, an IT security policy is determined based on the analysis of current environment deployed based on risk criteria appetite provided by client.

Method 500 includes a machine learning build for a client 502 that is optionally executed with a supervised specialist 504. Method 500 includes collecting IT information in an IT environment. For example, in some approaches, client workloads 506 and a client IT environment mapping 508 are collected as actual security information from the IT environment, e.g., see operation 510. Training 512 the machine learning models may include capturing IT information to use for the training, e.g., see operation 514. This IT information may be based on one or more of, e.g., a business application matrix and criticality 522, regulatory and industry requirements 524, technical information about software (SW) 526, etc. Operation 518 includes building an ML calibration model, e.g., using techniques described elsewhere herein for building and training machine learning models, e.g., see method 300. The ML calibration model is trained, e.g., see operation 516, and once trained is used as a predictable method 520 that includes trained machine learning models.

A risk criteria/appetite of the client 502 is received, e.g., see operation 528, and a level of risk confidence, e.g., client tolerance for risk, is determined, e.g., see operation 530. Based on this, the trained machine learning models are applied, e.g., IT information of the client 502 is input into the trained models, to determine security settings to apply based on the risk confidence, e.g., see operation 532.

Figure 6:
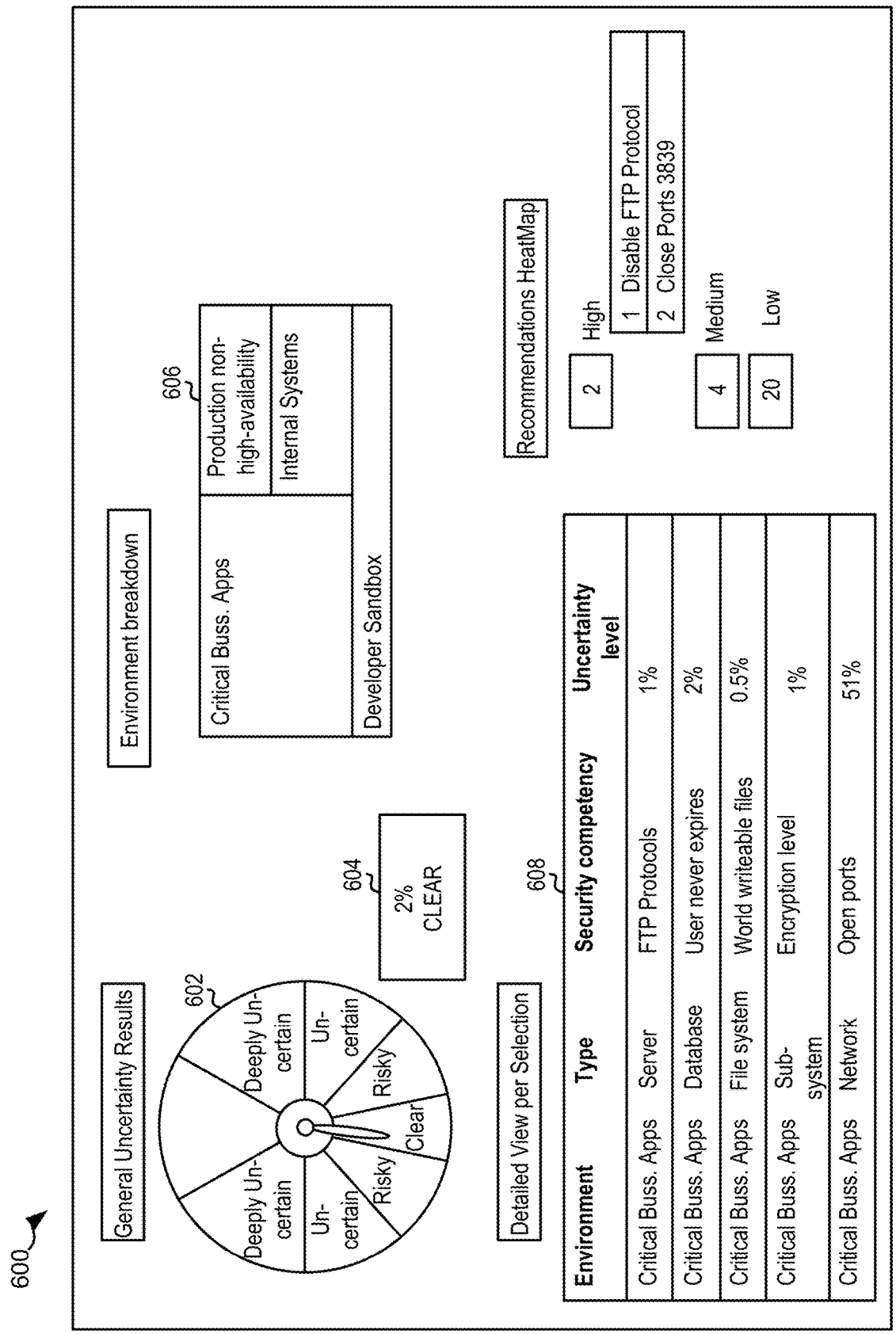
FIG. 6 is a graphical dashboard representation, in accordance with one embodiment of the present invention.

FIG. 6 depicts a dashboard representation 600, in accordance with one embodiment. As an option, the present dashboard representation 600 may be implemented in conjunction with features from any other embodiment listed herein, such as those described with reference to the other FIGS. Of course, however, such dashboard representation 600 and others presented herein may be used in various applications and/or in permutations which may or may not be specifically described in the illustrative embodiments listed herein. Further, the dashboard representation 600 presented herein may be used in any desired environment.

In some approaches, the dashboard representation 600 includes a map tree view according to a size of the IT environment. The dashboard representation 600 includes a dial 602 that characterizes a general uncertainty, e.g., deeply uncertain, uncertain, risky, and clear, of the results of running the trained machine learning models described elsewhere herein. A statistical measurement 604 of the general uncertainty is also included on the dashboard representation 600. The dashboard representation 600 also includes an environment breakdown 606 that details a deployment, e.g., see critical business application, a developer sandbox, a production non-high-availability, and internal systems, of the IT environment that were analyzed for computing a security policy. Information is also provided in the dashboard representation 600 about the critical business applications analyzed by the trained machine learning models, e.g., see detailed view per selection 608. The dashboard will identify the uncertainty level the client is willing to accept based on provided information and current environment deployed and security configurations settings deployed. More specifically, the breakdown 606 details competency and uncertainty levels for each of such applications, e.g., see security competency and uncertainty levels.

The dashboard representation 600 also may include an optimum IT security policy based on client security risk appetite and shows the recommendations heatmap of the security policy. For example, recommended security parameters of the computed security policy are also illustrated in a recommendations heatmap. These recommendations are based on the predictable methodology split by severity of the parameters that are to be applied. For example, in some approaches, each of the recommended security parameters are tiered into a tier of a plurality of different tiers, e.g., see High, Medium and Low, according to how the recommended security parameter conforms to the degree of risk. More specifically, the low tier includes twenty recommended security parameters, the medium tier includes four recommended security parameters, and the high tier includes two recommended security parameters, e.g., disabling an FTP protocol and closing ports 3839.

It will be clear that the various features of the foregoing systems and/or methodologies may be combined in any way, creating a plurality of combinations from the descriptions presented above.

It will be further appreciated that embodiments of the present invention may be provided in the form of a service deployed on behalf of a customer to offer service on demand.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A computer-implemented method, comprising:
receiving a request to perform a security policy implementation analysis for a first deployment associated with a first client in an IT environment;
collecting IT information associated with the first deployment;
applying trained machine learning models to analyze the IT information of the first client to compute a security policy for the first deployment,
wherein the security policy is computed based on a calculated uncertainty of effects that applying the security policy to the first deployment is capable of causing, and a predicted amount of resources of the first deployment that applying the security policy to the first deployment would consume;
outputting an indication of the security policy for display in a dashboard on a display of a user device of the first client;
training the machine learning models to analyze IT information; and
storing the trained machine learning models to a predetermined database, wherein training the machine learning models includes: retrieving IT information associated with a second deployment of a training IT environment; computing risk level errors from components of the second deployment and applications of the second deployment; transforming the IT information into training datasets for the machine learning models; training a first of the machine learning models using a first of the training datasets, wherein the first of the machine learning models is trained for calculating uncertainty; and training a second of the machine learning models using a second of the training datasets, wherein the second of the machine learning models is trained for predicting resource consumption.

2. The computer-implemented method of claim 1, comprising: receiving an indication of a degree of risk that the first deployment is currently capable of supporting in the IT environment, wherein the indication of the security policy includes a plurality of recommended security parameters, wherein each of the recommended security parameters are tiered according to how the recommended security parameter conforms to the degree of risk.

3. The computer-implemented method of claim 1, wherein the indication of the security policy includes a breakdown of a plurality of applications associated with the IT information, wherein the breakdown includes, for each of the applications, a security competency issue, and an issue specific uncertainty level, wherein the calculated uncertainty of effects that applying the security policy to the first deployment is capable of causing is based on each of the issue specific uncertainty levels.

4. The computer-implemented method of claim 1, wherein the effects that applying the security policy to the first deployment is capable of causing is selected from the group consisting of: a collateral effect that the applying the security policy would cause to customer features offered by applications of the first deployment, private customer information unintentionally becoming accessible, a loss of access event, and a loss of functionality of components of the first deployment, wherein the resources of the first deployment are selected from the group consisting of: administrator time, costs incurred by the first client, subject matter expert (SME) consultation, processing operations being devoted to troubleshooting operations, and time consumed in updating applications associated with the first deployment.

5. The computer-implemented method of claim 1, wherein the security policy is computed from a plurality of potential security actions identified from results of applying the trained machine learning models, wherein the potential security actions are used as an input for a predetermined genetic algorithm used in the computation of the security policy.

6. The computer-implemented method of claim 1, comprising: determining an IT service provider that offers a service that has at least a predetermined degree of similarity with the security policy; and outputting an indication of the determined IT service provider to the user device.

7. A computer program product, the computer program product comprising a computer readable storage medium having program instructions embodied therewith, the program instructions executable by a computer to cause the computer to:
receive, by the computer, a request to perform a security policy implementation analysis for a first deployment associated with a first client in an IT environment;
collect, by the computer, IT information associated with the first deployment;
apply, by the computer, trained machine learning models to analyze the IT information of the first client to compute a security policy for the first deployment,
wherein the security policy is computed based on a calculated uncertainty of effects that applying the security policy to the first deployment is capable of causing, and a predicted amount of resources of the first deployment that applying the security policy to the first deployment would consume;
output, by the computer, an indication of the security policy for display in a dashboard on a display of a user device of the first client;
to train, by the computer, the machine learning models to analyze IT information; and
store, by the computer, the trained machine learning models to a predetermined database, wherein training the machine learning models includes: retrieving IT information associated with a second deployment of a training IT environment; computing risk level errors from components of the second deployment and applications of the second deployment; transforming the IT information into training datasets for the machine learning models; training a first of the machine learning models using a first of the training datasets, wherein the first of the machine learning models is trained for calculating uncertainty; and training a second of the machine learning models using a second of the training datasets, wherein the second of the machine learning models is trained for predicting resource consumption.

8. The computer program product of claim 7, the program instructions executable by the computer to cause the computer to: receive, by the computer, an indication of a degree of risk that the first deployment is currently capable of supporting in the IT environment, wherein the indication of the security policy includes a plurality of recommended security parameters, wherein each of the recommended security parameters are tiered according to how the recommended security parameter conforms to the degree of risk.

9. The computer program product of claim 7, wherein the indication of the security policy includes a breakdown of a plurality of applications associated with the IT information, wherein the breakdown includes, for each of the applications, a security competency issue, and an issue specific uncertainty level, wherein the calculated uncertainty of effects that applying the security policy to the first deployment is capable of causing is based on each of the issue specific uncertainty levels.

10. The computer program product of claim 7, wherein the effects that applying the security policy to the first deployment is capable of causing is selected from the group consisting of: a collateral effect that the applying the security policy would cause to customer features offered by applications of the first deployment, private customer information unintentionally becoming accessible, a loss of access event, and a loss of functionality of components of the first deployment, wherein the resources of the first deployment are selected from the group consisting of: administrator time, costs incurred by the first client, subject matter expert (SME) consultation, processing operations being devoted to troubleshooting operations, and time consumed in updating applications associated with the first deployment.

11. The computer program product of claim 7, wherein the security policy is computed from a plurality of potential security actions identified from results of applying the trained machine learning models, wherein the potential security actions are used as an input for a predetermined genetic algorithm used in the computation of the security policy.

12. The computer program product of claim 7, the program instructions executable by the computer to cause the computer to: determine, by the computer, an IT service provider that offers a service that has at least a predetermined degree of similarity with the security policy; and output, by the computer, an indication of the determined IT service provider to the user device.

13. A system, comprising:
a hardware processor; and
logic integrated with the processor, executable by the processor, or integrated with and executable by the processor, the logic being configured to:
receive a request to perform a security policy implementation analysis for a first deployment associated with a first client in an IT environment;
collect IT information associated with the first deployment;
apply trained machine learning models to analyze the IT information of the first client to compute a security policy for the first deployment,
wherein the security policy is computed based on a calculated uncertainty of effects that applying the security policy to the first deployment is capable of causing, and a predicted amount of resources of the first deployment that applying the security policy to the first deployment would consume;

output an indication of the security policy for display in a dashboard on a display of a user device of the first client; and the logic being further configured to train the machine learning models to analyze IT information; and store the trained machine learning models to a predetermined database, wherein training the machine learning models includes: retrieving IT information associated with a second deployment of a training IT environment; computing risk level errors from components of the second deployment and applications of the second deployment; transforming the IT information into training datasets for the machine learning models; training a first of the machine learning models using a first of the training datasets, wherein the first of the machine learning models is trained for calculating uncertainty; and training a second of the machine learning models using a second of the training datasets, wherein the second of the machine learning models is trained for predicting resource consumption.

14. The system of claim 13, the logic being configured to: receive an indication of a degree of risk that the first deployment is currently capable of supporting in the IT environment, wherein the indication of the security policy includes a plurality of recommended security parameters, wherein each of the recommended security parameters are tiered according to how the recommended security parameter conforms to the degree of risk.

15. The system of claim 13, wherein the indication of the security policy includes a breakdown of a plurality of applications associated with the IT information, wherein the breakdown includes, for each of the applications, a security competency issue, and an issue specific uncertainty level, wherein the calculated uncertainty of effects that applying the security policy to the first deployment is capable of causing is based on each of the issue specific uncertainty levels.

16. The system of claim 13, wherein the security policy is computed from a plurality of potential security actions identified from results of applying the trained machine learning models, wherein the potential security actions are used as an input for a predetermined genetic algorithm used in the computation of the security policy.

17. The system of claim 13, the logic being configured to: determine an IT service provider that offers a service that has at least a predetermined degree of similarity with the security policy; and output an indication of the determined IT service provider to the user device.

* * * * *